June 2, 1936. W. G. KOUPAL 2,042,852
GLASS TANK AND METHOD OF OPERATING THE SAME
Filed May 29, 1934  2 Sheets-Sheet 2
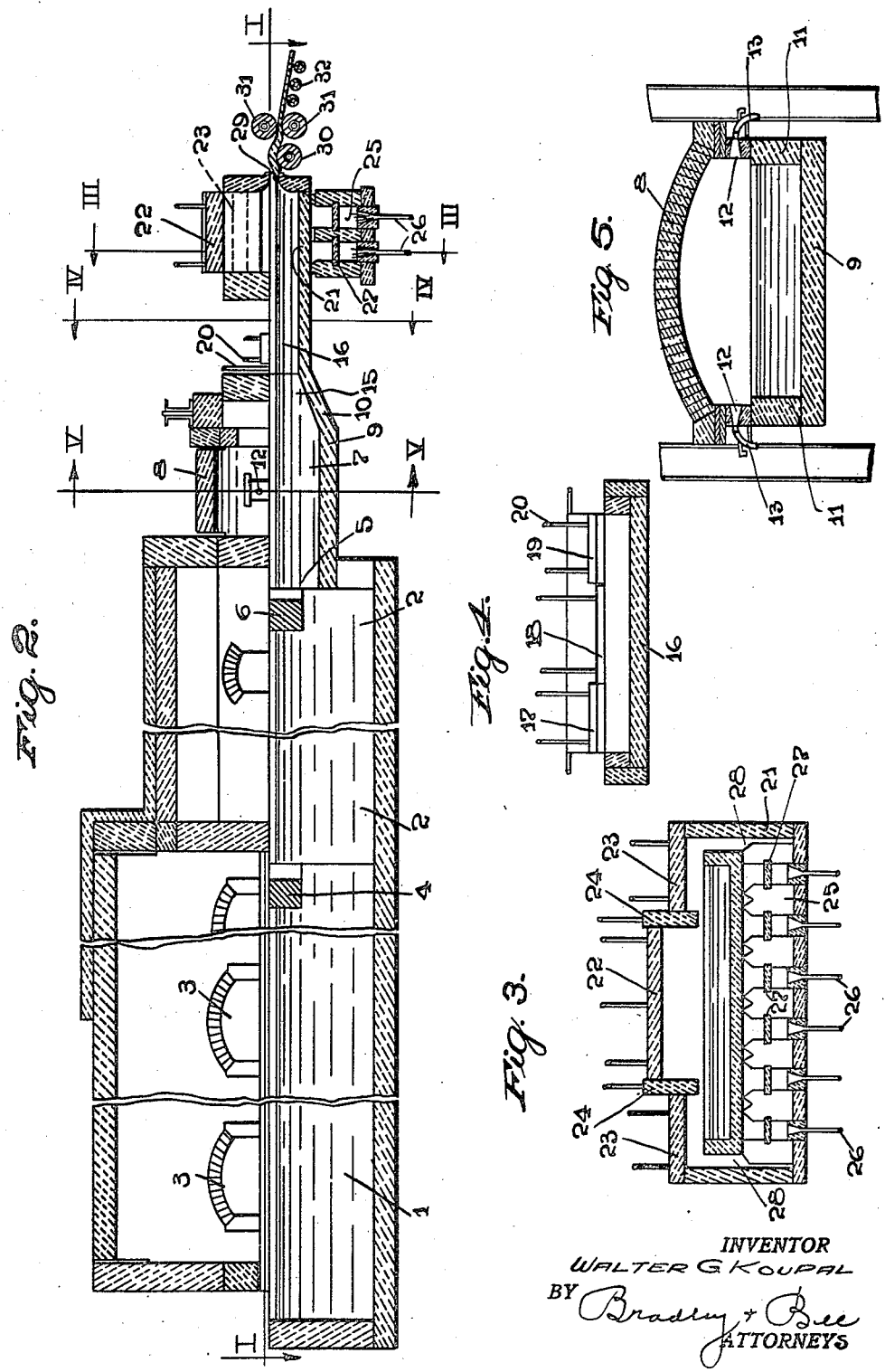
INVENTOR
WALTER G KOUPAL
BY Bradley + Bee
ATTORNEYS Patented June 2, 1936

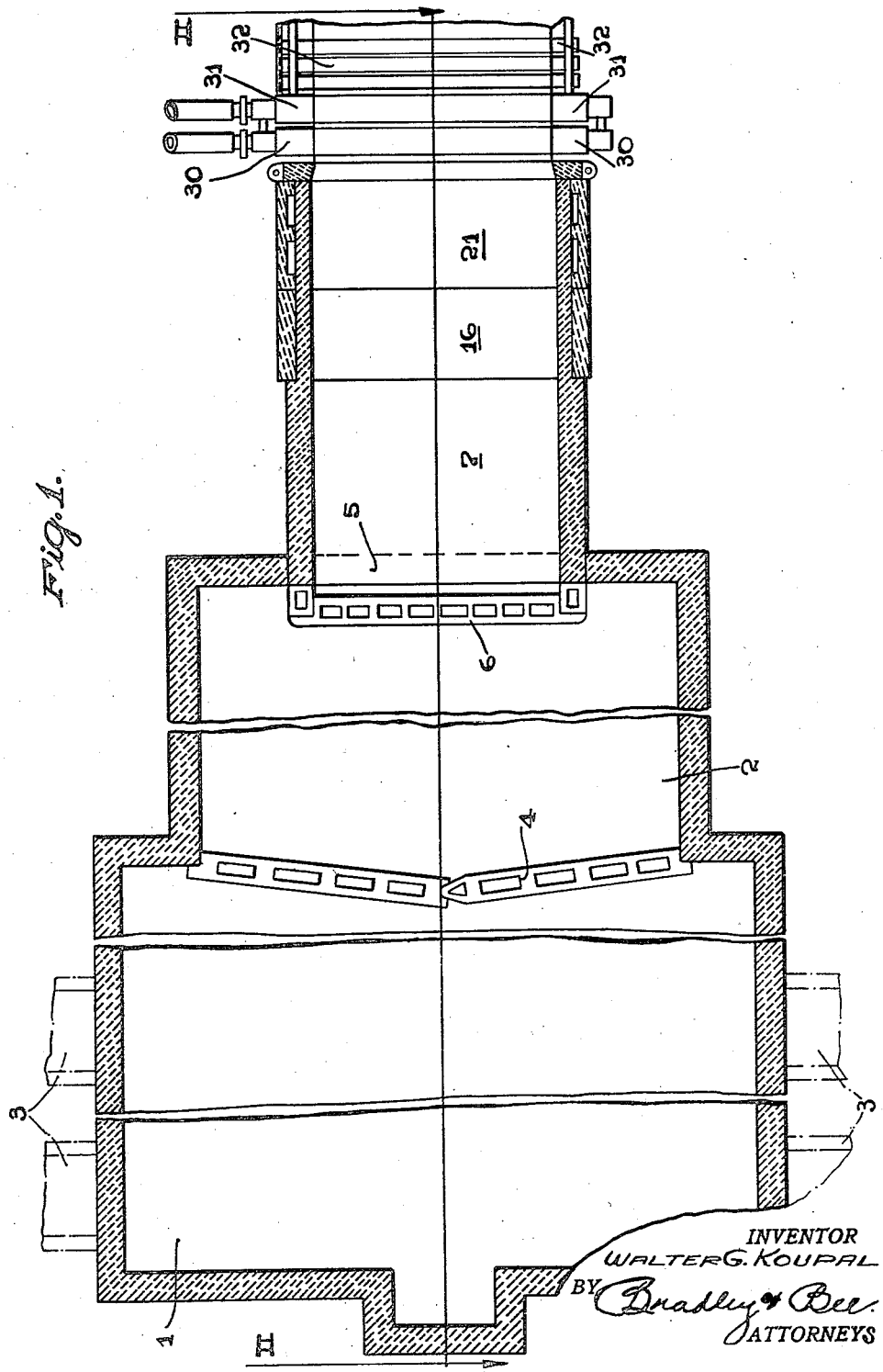

2,042,852

UNITED STATES PATENT OFFICE 2,042,852

GLASS TANK AND METHOD OF OPERATING THE SAME

Walter G. Koupal, Tarentum, Pa., assignor to Pittsburgh Plate Glass Company, a corporation of Pennsylvania Application May 29, 1934, Serial No. 728,092

5 Claims. (Cl. 49—56)

The invention relates to a glass tank construction and method for use in making glass by a continuous process. One object of the invention is to provide an arrangement permitting the operation of the melting tank at high temperature throughout its length, thus giving a maximum opportunity for the escape of bubbles. Another object is the provision of a construction whereby the inflow of air into the outlet slot of the reconditioning pot is avoided, so that a chilling of the surface glass in the pot is avoided. A still further object is the provision of means whereby the stream of glass flowing from the melting tank may be equalized from one side of such stream to the other before reaching the sheet forming means, and whereby the bubbles at the surface of the glass may be eliminated before they reach the reconditioning pot. One embodiment of the invention is illustrated in the accompanying drawings, wherein:

Figure 1 is a horizontal section on the line I—I of Fig. 2. Fig. 2 is a section on the line II—II of Fig. 1. And Figs. 3, 4 and 5 are vertical sections on the lines III—III, IV—IV and V—V respectively of Fig. 2. For simplicity in showing, only the clay work is illustrated in the drawings, but it will be understood that such clay work is in practice supported by the usual underframing of commercial sections which constitutes no part of the present invention.

Referring to the drawings, 1 is the melting end of a glass tank, and 2 is the refining end or section. The melting end is provided with the usual regenerator ports 3, a part only of which is shown, and the usual floater 4 is employed between the melting and refining end of the tank. The refining end of the tank is provided with an outlet passage 5 and a second floater or skim bar 6 is positioned just back of such outlet.

The outlet passage 5 discharges into a chamber or pot 7 of less width and depth than the refining end of the tank. This chamber is provided with an arch or roof 8, a bottom 9 having the upwardly inclined portion 10 at the outlet of the chamber, and the side walls 11 provided with the openings 12 opposite which are located the burner pipes 13 for supplying a mixture of gas and air over the surface of the glass. Preferably considerable pressure is employed in supplying the combustible gas, and as a result, the temperature attained in the chamber is relatively high. In this way, a flash of heat may be applied to the surface of the glass flowing through the chamber and such surface is rendered very fluid. If bubbles, which are at the surface of the glass, do not expand and burst at once, they are brought close to the surface in the light frothy condition, and when exposed to the coolers upon emerging into the open section (later described) the sudden chill causes a rapid contraction which bursts the bubbles.

The chamber 7 is provided at its forward end with an outlet opening 15 which discharges into a trough 16 which is open to the atmosphere. In this portion of the apparatus, the temperature of the stream of glass is very materially reduced, which is desirable, since the temperature of the body of glass must be lowered very materially before it is formed into a sheet. In order to increase the cooling effect incident to the exposure of the surface of the glass to the atmosphere, the water coolers 17, 18 and 19 are employed, the water coolers being supplied with a flow of cooling water through the pipes 20. The coolers are mounted for vertical movement in order to adjust the cooling effect to meet requirements. These coolers also act as additional equalizing means whereby the temperature of the glass in the trough is kept at a uniform temperature from one side of the trough to the other. The water coolers also perform another important function heretofore referred to in clearing the surface of the glass from bubbles which may have accumulated at such surface and would subsequently form defects in the glass when withdrawn to form the sheet. The use of the coolers causes any bubbles at the surface of the glass to burst.

The trough discharges at its front end into a reconditioned pot 21, such pot being preferably of the same width and depth as the trough. This pot has a roof consisting of the central section 22 and the side sections 23, 23 which are vertically adjustable independently of each other. The side sections 23, 23 are shown (Fig. 3) in their lowest positions of adjustment. When these sections are adjusted upward, the spaces thus made between the edges of the sections and the side walls 21 of the tank are closed with filler blocks of refractory material. The roof is also provided with the shade members 24, 24 which are vertically adjustable. Beneath the pot is a combustion chamber 25, to which a mixture of gas and air is supplied from the burner pipes 26. This combustion chamber is provided with baffles 27 and at each side a passage 28 leads upward to the space above the surface of the glass in the pot. By the use of the heating means in conjunction with the vertically adjustable roof, the glass in the pot may be equalized in temperature from one side of the pot to the other and brought to the proper temperature for sheet formation. If the central portion of the bath is running too hot, the central section 22 of the cover is raised, and the shade members 24, 24 are lowered to shield the center of the pot from the heat coming from the passages 28 at the sides of the pot. The body of glass in the tank is also brought to substantially the same temperature from its bottom to its top. The heat treatment in this pot not only brings the glass to uniform temperature, but also eliminates from the surface thereof the cold skin which necessarily forms upon the surface of the stream as the glass passes through the open trough 16.

At the forward end of the pot 21 is an outlet slot 29 through which a thin layer of glass flows onto the roll 30. From this point, the layer of glass passes between the sizing rolls 31, 31 and onto the roller apron 32 which leads the glass into the usual roller annealing leer.

Since the space above the glass in the pot 21 does not communicate with the space above the glass in the melting tank, the "pull" of the tank is not imposed upon the air space in the pot, and there is thus no tendency to cause an inflow of cooling air into the pot through the slot 29. Such flow of air through the outlet slot of the pot in a tank of ordinary construction tends to chill the surface of the glass flowing to the slot and involves a disadvantage which is overcome in the present construction. The use of the chamber 7 and trough 16 intermediate the melting tank and the pot 21 involves a further advantage in that it permits the operation of the melting tank, and particularly the refining end thereof at a higher temperature than would be feasible if the pot 21 were located close to the refining end of the tank and in direct communication therewith. In this latter case, the high temperature in the refining end of the tank would bring the glass in the pot to a temperature too high for proper sheet formation. The maintenance of the temperature in the refining end of the tank at a high point is desirable since, under this condition, the glass is more fluid, thus permitting the gas bubbles to escape readily. The present construction, therefore, permits the operation of the melting tank throughout at a temperature which will give the best results and at the same time permits the outlet kiln or pot to be operated at a very much lower temperature, at which the best results may be secured. It will be understood that the sheet forming mechanism at the outlet end of the pot 21 may be of any desired type and that the mechanism shown, including the rolls 30, 31 and 32, are driven by the usual power means which are well known in the art.

What I claim is:

1. In combination with a glass melting tank having a melting section provided with regenerators and a refining section forward of the melting section provided at its forward end with an outlet passage, a chamber of less depth than the refining section forward of such section and separated therefrom above the surface of the glass by a vertical partition into which said passage leads and itself having a discharge passage at its forward end, means for applying heat over the glass in said chamber, a trough open to the atmosphere forward of said chamber in position to receive the discharge therefrom, a covered pot forward of the trough in position to receive the discharge therefrom and provided at its front end with a discharge slot adapted to supply glass continuously to sheet forming means, means for heating the pot, and water cooled means above the trough for chilling the surface of the glass as it flows through the trough.

2. Sheet glass making apparatus comprising a container to the rear end of which molten glass is delivered, means for withdrawing glass from the forward end of the container, means for heating the container, and a cover for the container including a central vertically adjustable roof section, a side roof section at each side of said central section, and a pair of vertical shade members, one on each side of the central roof section between such section and the adjacent side roof sections mounted for vertical adjustment.

3. Sheet glass making apparatus comprising a container to the rear end of which molten glass is delivered, means for withdrawing glass from the forward end of the container, means for heating the container, and a cover for the container including a central vertically adjustable roof section, a side roof section at each side of said central section, mounted for vertical adjustment, and a pair of vertical shade members, one on each side of the central roof section between such section and the adjacent side roof sections mounted for vertical adjustment.

4. Sheet glass making apparatus comprising a container to the rear end of which molten glass is delivered, means for withdrawing glass from the forward end of the container, means for heating the container including a combustion chamber therebeneath and passages therefrom to the area over the pot leading vertically from said chamber around the side edges of the container, and a cover for the container including a central vertically adjustable roof section, a side roof section at each side of said central section, and a pair of vertical shade members, one on each side of the central roof section between such section and the adjacent side roof sections mounted for vertical adjustment.

5. A method of making sheet glass which consists in melting batch in a melting area, conducting the molten glass forwardly to a fining area of lower temperature and there fining it, conducting the fined glass forwardly therefrom into a covered reheating area which has a space lying above the glass substantially closed off from the space above the glass in the fining area, applying heat above the glass in the reheating area to increase its fluidity, flowing the glass forwardly from the reheating area with its surface exposed to a chilling action, conducting the chilled glass forwardly therefrom into a covered area, reheating it therein, and finally withdrawing a layer of glass continuously from such last area to form a sheet.

WALTER G. KOUPAL.